(12) United States Patent
Kleppe et al.

(10) Patent No.: US 9,389,403 B2
(45) Date of Patent: Jul. 12, 2016

(54) MICROSCOPE AND METHOD FOR OPERATING A MICROSCOPE

(71) Applicant: Carl Zeiss Microscopy GmbH, Jena (DE)

(72) Inventors: Ingo Kleppe, Jena (DE); Mirko Liedtke, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 204 days.

(21) Appl. No.: 14/049,683

(22) Filed: Oct. 9, 2013

(65) Prior Publication Data

US 2014/0029091 A1 Jan. 30, 2014

Related U.S. Application Data

(63) Continuation of application No. 12/679,967, filed on Apr. 7, 2010, now abandoned.

(51) Int. Cl.
*G02B 21/06* (2006.01)
*G02B 21/00* (2006.01)

(52) U.S. Cl.
CPC ............ *G02B 21/06* (2013.01); *G02B 21/0076* (2013.01)

(58) Field of Classification Search
CPC ............... G02B 21/00; G02B 21/0032; G02B 21/0052; G02B 21/06; G02B 21/008; G02B 21/0024; G02B 21/0036; G02B 21/0064; G02B 21/0076; G02B 21/16; G01N 21/6458
USPC ............ 359/368, 385, 388; 250/201.1, 201.2, 250/201.3, 201.4, 204, 205, 234, 459.1, 250/559.04
See application file for complete search history.

(56) References Cited

U.S. PATENT DOCUMENTS 5,594,235 A  1/1997  Lee
5,764,363 A  6/1998  Ooki et al.
(Continued)

FOREIGN PATENT DOCUMENTS

DE  19829981 A1  1/2000
DE  19957418 A1  5/2001
(Continued)

OTHER PUBLICATIONS

Seibert, Joachim, PCT, "International Search Report", International Application No. PCT/EP2008/006089, Mail Date Apr. 12, 2008.
(Continued)

*Primary Examiner* — Bumsuk Won
*Assistant Examiner* — Ephrem Mebrahtu
(74) *Attorney, Agent, or Firm* — Hoffman Warnick LLC (57) ABSTRACT

The invention relates to a method for operating a microscope in which excitation light is focused on, or beamed to, different points of a specimen, in which an intensity of the excitation light is point-specifically varied and in which an intensity of the light reflected by said specimen in at least one spectral range is measured point-specifically and quantitatively. The method according to the invention is characterized in that the intensity and/or a spectral composition of the excitation light beamed to a specific point of said specimen is automatically adjusted by a regulating device on the basis of information previously gained from measured data of said specimen concerning an estimated or actual intensity of the light reflected in the spectral range by said point such that an integral of the intensity of the light reflected in the spectral range by this point during a pixel dwell time is within a predefined value interval. The invention also relates to a microscope.

34 Claims, 8 Drawing Sheets

(56) References Cited

U.S. PATENT DOCUMENTS

| | | | |
|---|---|---|---|
| 5,923,466 | A | 7/1999 | Krause et al. |
| 6,262,837 | B1 | 7/2001 | Nagano et al. |
| 6,462,345 | B1 | 10/2002 | Simon et al. |
| 6,621,628 | B1 * | 9/2003 | Ogino ............... G02B 21/0024 250/201.1 |
| 6,687,035 | B2 | 2/2004 | Knebel et al. |
| 6,738,190 | B2 | 5/2004 | Engelhardt et al. |
| 6,740,868 | B1 | 5/2004 | Knebel et al. |
| 6,781,751 | B2 | 8/2004 | Arai |
| 7,221,503 | B2 | 5/2007 | Eberhardt et al. |
| 7,253,946 | B2 | 8/2007 | Bellouard et al. |
| 7,253,950 | B2 | 8/2007 | Araya |
| 7,268,344 | B2 | 9/2007 | Sasaki et al. |
| 7,391,567 | B2 | 6/2008 | Weiss |
| 2002/0097487 | A1 | 7/2002 | Arai |
| 2002/0109840 | A1 | 8/2002 | Wolleschensky et al. |
| 2003/0147133 | A1 | 8/2003 | Engelhardt |
| 2004/0125440 | A1 | 7/2004 | Arai |

FOREIGN PATENT DOCUMENTS

| | | |
|---|---|---|
| DE | 10222359 A1 | 12/2003 |
| EP | 0564178 A1 | 10/1993 |
| EP | 0977069 A2 | 2/2000 |
| EP | 1681589 A1 | 7/2006 |
| JP | H09138353 A | 5/1997 |
| JP | 09189864 A1 | 7/1997 |
| JP | 2000035400 A | 2/2000 |
| JP | 2002131645 A | 5/2002 |
| JP | 2002513928 A | 5/2002 |
| JP | 2003344776 A | 12/2003 |
| JP | 2006227600 A | 8/2006 |
| JP | 2007500880 A | 2/2007 |
| WO | 9957545 A1 | 11/1999 |
| WO | 2004/102249 A1 | 11/2004 |

OTHER PUBLICATIONS

PCT, "International Preliminary Report on Patentability", International Application No. PCT/EP2008/006089, Date of Issuance of Report Jun. 1, 2010, 7 pages.

Consilvio, U.S. Appl. No. 12/679,967, Office Action Communication, Jun. 26, 2012, 15 pages.

Consilvio, U.S. Appl. No. 12/679,967, Office Action Communication, Apr. 10, 2013, 12 pages.

Hopt et al., "Highly Nonlinear Photodamage in Two-Photon Fluorescence Microscopy", Biophysical Journal, vol. 80, Apr. 2001, pp. 2029-2036.

Koester et al., "Ca2+ Fluorescence Imaging with Pico- and Femtosecond Two-Photon Excitation: Signal and Photodamage", Biophysical Journal, vol. 77, Oct. 1999, pp. 2226-2236.

Neher et al., "Optimizing imaging parameters for the separation of multiple labels in a fluorescence image", Journal of Microscopy, vol. 213, Pt. 1, Jan. 2004, pp. 46-62.

Donnert et al., "Major signal increase in fluorescence microscopy through dark-state relaxation", Nature Methods, vol. 4, No. 1, Jan. 2007, pp. 81-86.

Chu et al., "Enhanced weak-signal sensitivity in two-photon microscopy by adaptive illumination", Optics Letters, vol. 32, No. 19, Oct. 1, 2007, pp. 2846-2848.

Dixit et al., "Cell damage and reactive oxygen species production induced by fluorescence microscopy: effect on mitosis and guidelines for non-invasive fluorescence microscopy", The Plant Journal, 2003, 36, pp. 280-290.

* cited by examiner

MICROSCOPE AND METHOD FOR OPERATING A MICROSCOPE

REFERENCE TO PRIOR APPLICATIONS

The current application is a Continuation application of U.S. Utility application Ser. No. 12/679,967, which was filed on 7 Apr. 2010, which is hereby incorporated by reference.

TECHNICAL FIELD

The present invention relates, in a first aspect, to a method for operating a microscope and to a microscope.

RELATED ART

A generic method and a generic microscope are disclosed in EP 0 977 069 B1, for example. In a method of the type mentioned above, excitation light is focused on, or beamed to, different points of a specimen, and an intensity of the excitation light is varied point-specifically, and an intensity of light reflected by the specimen is measured in at least one spectral range point-specifically and quantitatively.

A generic microscope comprises the following components: a light source for emitting excitation light for the microscopic examination of a specimen, an intensity modulator for varying an intensity of the excitation light, a microscope optics for guiding the excitation light to different points of the specimen to be examined and for guiding light reflected by said different points of the specimen to a detector, and said detector for point-specific and quantitative detection of an intensity of the light reflected by the specimen in at least one spectral range.

The dynamic range of present-day photodetectors is, particularly in laser-scanning microscopy, frequently insufficient for simultaneous resolution, with equal sensitivity, of very fine and dark structures on the one hand and very light image areas on the other hand. In fluorescence microscopy, parts of the image are therefore frequently overdriven and/or other parts can no longer be distinguished from background noise.

Furthermore, the photodamage caused in cells and tissue by intense illumination is to date one of the key factors that significantly limits the number of possible image-recordings of living cells and thus the measurement time, cf. Koester H J., Baur, D. Uhl, R. and Hell, S. W. (1999), Biophys. J., 77(4): 2226-2236; Hopt, A. and Neher, E. (2001), Biophys. J., 80 (4) 2029-2036.

In the field of laser-scanning microscopy, limits are often reached as far as minimization of photobleaching effects and optimization of the level control in the detector are concerned. These problems are particularly well approached by the principle of photon counting, but the advantages of a high signal to noise ratio are offset by a relatively small dynamic range. Above a counting rate of about 10 MHz, counting becomes nonlinear and can hardly be corrected above a counting rate of about 30 Mhz. A user is therefore obliged to keep the illumination on the specimen incessantly within an optimum range, if only for the reason of protecting the photo multiplier, which is operated under maximum high potential, from destruction.

Essentially three techniques are currently available for extending the dynamic range. Firstly, improved detectors, i.e. cameras, for example those having an extremely large dynamic range, can be used. However, dynamic depths of 16 bits have hardly ever been achieved for microscopic purposes. Highly sensitive CCD cameras having an extremely large dynamic range are scarcely used in laser-scanning microscopy on account of light scatter.

The problem of insufficient dynamic range can additionally be avoided relatively easily by creating a number of images that are recorded at different degrees of illumination and then computed. The disadvantage of this method is not only the significantly greater stress on the specimen but also the recording time required. This method is either not possible or at least not optimal for many applications, particularly those involving measurements performed on living cells.

Finally, a method named "controlled light exposure microscopy", abbreviated to CLEM, is proposed in WO 2004/102249 A1. For laser-scanning microscopy, the exposure time is regulated pixel by pixel during scanned image-recording using a rapid feed-back regulating process in which the illumination for the respective pixel is switched off and the exposure thus stopped once a predetermined threshold value has been reached in the detector.

Other possible solutions have been proposed for reducing photodamage and photobleaching. Photodamage caused during measurements performed on living cells can, firstly, occur by excitation of molecules other than those of the dye, cf. Koester H. J., Baur, D. Uhl, R. and Hell, S. W. (1999), Biophys. J., 77(4): 2226-2236. Secondly, photodamage also takes place as a result of excitation of the dye itself, which decomposes to toxic products after a certain number of excitation cycles. There are different methodic approaches for reducing photobleaching of dyes and preventing photodamage in the specimen. For example, improvements can be achieved by changing or optimizing the dyes. Furthermore, optimization can be achieved during the preparation of the object. Additionally, improvements in the field of detection and excitation are possible. Of significance to the invention is an improvement in excitation, for which substantially two technical approaches for reducing photobleaching have been disclosed hitherto. The first approach is the "controlled light exposure microscopy" mentioned above. The second proposed approach is a method called "T-REX illumination". The latter is a method for achieving pulsed laser illumination, the pulse rate for the excitation being adapted to a relaxation time of triplet states of the dyes, cf.: Donnell, G., Eggeling, C. and Hell, S. W. (2007), Nat. Methods, 4(1); 81-86.

A generic method and a generic microscope are further described in OPTICS LETTERS, Vol. 32, No. 19, Oct. 1, 2007.

SUMMARY

The present invention provides a microscope and a method for operating a microscope which involve extension of the dynamic range and reduction of photodamage in the specimens being examined, more particularly living cells, and reduction of the photobleaching of dyes.

The method of the type mentioned above is developed, according to the invention, in that the intensity and/or a spectral composition of the excitation light beamed to a specific point of the specimen is adjusted by a regulating device dependent on an information previously gained from measured data of the specimen concerning an estimated or actual intensity of the light reflected in the spectral range by the point such that an integral of the intensity of the light reflected in the spectral range by the point during a pixel dwell time is within a predefined value interval.

The microscope of the type mentioned above is further developed, according to the invention, in that a regulating device is provided which cooperates with the intensity modulator and the detector and adjusts the intensity and/or a spectral composition of the excitation light beamed to a point of the specimen on the basis of an information previously gained from measured data of the specimen concerning an estimated or actual intensity of the light reflected in the spectral range by the point such that an integral of the intensity, detected for the point by the detector, of the light reflected in the spectral range during a pixel dwell time is within a predefined value interval.

The method of the type mentioned above is further developed, according to the invention, in that the intensity and/or a spectral composition of the excitation light beamed to a specific point of the specimen is adjusted by a regulating device on the basis of an information previously gained from measured data of the specimen concerning an estimated or actual intensity of the light reflected in the spectral region from the point such that an integral of the intensity of the light reflected in the spectral region by the point during a pixel dwell time is within a predetermined value interval, which regulating device adjusts the intensity of the excitation light for a specific point such that the integral of the intensity of the light reflected by the point during a pixel dwell time is within a value interval only when a signal criterion for this point is satisfied.

The microscope of the type mentioned above is further developed, according to the invention, in that a regulating device is provided which cooperates with the intensity modulator and the detector and adjusts the intensity and/or a spectral composition of the excitation light beamed to a point of the specimen on the basis of an information previously gained from measured data of the specimen concerning an estimated or actual intensity of the light reflected in the spectral range by the point such that an integral of the intensity, detected for the point by the detector, of the light reflected in the spectral range during a pixel dwell time is within a predetermined value interval, which regulating device adjusts the intensity of the excitation light for a specific point such that the integral of the intensity of the light reflected by the point during a pixel dwell time is within a value interval only when a signal criterion for this point is satisfied.

The method of the type mentioned above is further developed, according to the invention, in that the intensity and/or a spectral composition of the excitation light beamed to a specific point of the specimen is automatically adjusted by a regulating device on the basis of an information previously gained from measured data of the specimen concerning an estimated or actual intensity of the light reflected in the spectral range by the point such that an integral of the intensity of the light reflected in the spectral range by the point during a pixel dwell time is within a predefined value interval, that the excitation light includes a plurality of wavelengths for exciting a plurality of different dyes and that the intensity of the light reflected by the specimen is measured in a plurality of different spectral ranges.

The microscope of the type mentioned above is further developed, according to the invention, in that a regulating device is provided which cooperates with the intensity modulator and the detector and automatically adjusts the intensity and/or a spectral composition of the excitation light beamed to a point of the specimen on the basis of an information previously gained from measurement data of the specimen concerning an estimated or actual intensity of the light reflected in the spectral range by the point such that an integral of the intensity, detected for the point by the detector, of the light reflected in the spectral range during a pixel dwell time is within a predefined value interval, that the light source for exciting a plurality of different dyes emits excitation light having a plurality of wavelengths and that a plurality of detectors is present for quantitative and point-specific detection of the light reflected by the specimen in a plurality of spectral ranges.

The method of the type mentioned above is further developed, according to the invention, in that the intensity and/or a spectral composition of the excitation light beamed to a specific point of the specimen is automatically adjusted by a regulating device on the basis of an information previously gained from measured data of the specimen concerning an estimated or actual intensity of the light reflected in the spectral range by the point such that an integral of the intensity of the light reflected in the spectral range by the point during a pixel dwell time is within a predefined value interval, and that the regulating device adjusts the intensity of the excitation light beamed to a specific point on the basis of an intensity of the reflected light determined for the point in a previous image.

The microscope of the type mentioned above is further developed, according to the invention, in that a regulating device is provided which cooperates with the intensity modulator and the detector and automatically adjusts the intensity and/or a spectral composition of the excitation light beamed to a point of the specimen on the basis of an information previously gained from measured data of the specimen concerning an estimated or actual intensity of the light reflected in the spectral range by the point such that an integral of the intensity, detected for the point by the detector, of the light reflected in the spectral range during a pixel dwell time is within a predefined value interval, and that the regulating device adjusts the excitation light intensity beamed to a specific point on the basis of a reflected light intensity determined for the point in a previous image.

Variants of the method of the invention and advantageous exemplary embodiments of the microscopes of the invention are the subject matter of the dependent claims and are additionally described below in more detail.

The central idea of the invention differs from that of the controlled light exposure microscopy method in that the intensity of the illumination of the specimen is adapted spatially to the optical properties of the specimen instead of working with substantially one and the same intensity over the entire specimen.

One finding of the invention resides, due to the nonlinear dependence of photodamaging processes on intensity, in the fact that significant improvements with respect to damage to the specimen can be achieved by specific adaptation of the excitation intensity.

Another finding of the invention is that by shifting the dynamic variation to the excitation side, a possibly insufficient dynamic depth of the detector used becomes basically of no importance and can be ignored. Therefore, detectors having particularly good signal to noise ratios can be specifically selected.

The present invention therefore provides an imaging method which provides considerable improvements in the dynamic depth of the images achieved and additionally significant reduction of photodamaging and photobleaching processes, which constitute limiting factors when examining living specimens.

For the purposes of the invention, "excitation light" described herein is to be understood to mean any kind of electromagnetic radiation used for microscopy. This radiation can, but need not, lie in the visible range.

The light source used is basically any type of radiation source for electromagnetic radiation in the desired spectral range. Suitable lasers may be used for this purpose.

The light reflected by the specimen can basically be any type of electromagnetic response of the specimen to previous excitation by the excitation radiation. Here, different contrast-enhancing principles can be implemented. For example, these can include reflected or scattered radiation. In particular, these principles can include fluorescent radiation, dual photon fluorescence or Raman scattering, for example radiation from a CARS process.

The term "point" as used in this specification is not employed in the mathematical sense. Instead, it refers to a focal volume in the order of magnitude achievable using typical microscope optics. For example, the dye molecules present in the focal volume in question are excited by the excitation light and they emit the typical fluorescence photons following relaxation. In principle, the detectors used can be any of those capable of effecting detection in the respective spectral ranges. Preferably photo multipliers are used due to their extremely good signal to noise ratios. These may be multiple detectors of the multi-channel plate type. Alternatively, other spatial detectors such as CCD or other semiconductor arrays can be used.

In a variant of the method of the invention, the value interval relating to the integral of the intensity of the light reflected by a point during the pixel dwell time is set such that a detector used is able to operate with best possible sensitivity and at a best possible signal to noise ratio. The shift to the excitation side removes the restriction to a reduced dynamic depth of the detector used, and the interval between values can be carefully adjusted such that the detector is able to operate in an advantageous range.

In principle, the value intervals can have a width adapted to a usable dynamic depth of the detector. In a variant, however, the regulating process is carried out such that the integral of the intensity of the light reflected by a point during a pixel dwell time is constant, this being particularly true for all points satisfying a signal criterion. Back-computation, for example, of a dye concentration of interest in the focal volume observed is then comparatively simple.

It is further advantageous to carry out the regulating process such that the intensity of the excitation light for a specific point during a pixel dwell time remains as constant as possible following a stabilization phase of the regulating process. The non-linear dependence of photodamaging processes thus minimizes damage to the specimen.

In principle, the regulating device can adjust the intensity of the excitation light beamed to a specific point for all points such that the intensity integral of the reflected light is within the specified value interval. However, in a variant of the method the regulating device adjusts the intensity of the excitation light for a specific point such that the integral of the intensity of the light reflected by the point during a pixel dwell time is within a predetermined value interval only if a signal criterion for this point is satisfied. It is thus possible to prevent the intensity of the excitation light from being regulated to an extremely high value at points in which, for example, the intensity of the reflected light is very low, and thus from triggering photodamaging processes in adjacent specimen areas, for example.

In a further variant, the same pixel dwell time is used for all points. Evaluation, for example, with respect to a dye concentration of interest is again comparatively easy. In principle, different pixel dwell times can be used also for different points. It may be advantageous, for example, to use the same pixel dwell time only for all points satisfying a signal criterion. In particular, the pixel dwell time can be reduced for points that do not satisfy the signal criterion. The image-recording time for an image or a scan is thus likewise reduced and the image-recording rate can be increased.

Basically, the signal criterion can be fed in externally as a point-specific signal. In other words, the signal criterion for a specific point is satisfied when an externally supplied point-specific signal has a predefined value.

In an embodiment of the method of the invention, measured information of the point in question is used as the signal criterion. The signal criterion for a specific point is satisfied when the estimated or actual intensity of the light reflected by the point is above a specifiable background threshold.

In this way, the excitation intensities are adjusted upwardly only in the case of points in which actually significant intensities are reflected, for example, from the dyes present at the points. Photodamage to the specimen can be further reduced in this way.

Additional variants of the method of the invention can be distinguished basically in terms of the point in time at which, or the time interval within which, the illumination regulation is carried out. For example, this regulating process can be carried out during the exposure of an individual pixel, that is to say, within a pixel dwell time. Furthermore, such a regulating process is possible during a scan process. In particular, the required information concerning the estimated reflected light can be gained from measurements on directly or indirectly adjacent points. This is explained in more detail below. Finally, the regulating process in question can be carried out between individual images when recording time series, wherein information concerning the specimen already acquired from the previously recorded images is used, in the simplest case in the manner of a negative image.

For example, for roughly determining an intensity of the light reflected by individual points, a test pattern or test scan can be recorded. This provides the information required by the invention concerning an estimated intensity of the light reflected by a point in question. Such a test scan or test pattern can be dispensed with if the information concerning the estimated intensity of the light reflected by a point is provided by an initial measurement of the intensity of the light reflected by the point. In this case, the intensity of the reflected light is measured at the start of a pixel dwell time. The prerequisite involved is that the regulation process must work sufficiently rapidly and be able to adjust to the correct intensity within a pixel dwell time. The intensity of the excitation light beamed to this point during the dwell time of the excitation beam on this point is monitored accordingly.

For the purpose of regulating the illumination within an exposure time, that is to say, within a pixel dwell time, the illumination for each pixel is regulated dynamically by a fast feedback on the basis of the information already acquired, that is to say, measured data of the specimen. The image is thus constructed not only with the aid of the detected intensity, as is common practice, but also with the aid of the illuminating power used and the exposure time or a combination thereof. The differences in the illumination between conventional imaging, the CLEM method, and the invention presented here, also referred to as the DIM method, are described in detail below.

In single photon excitation, the measured intensity in the detector is proportional to the product of the dye concentration and the illuminating power and, in the case of dual photon excitation, to the square of the illuminating power. In conventional illumination, the illuminating power is constant in terms of space and time for all pixels in the image:

$$I(x, t) \propto p \cdot \int_0^t c(x, t') dt'$$

where I is the detected fluorescence, x is the position vector, t is the time, and p is the beamed illuminating power. In the CLEM method, the integration limit is varied spatially, but the illuminating power as such is kept spatially constant.

$$I(x, t) \propto p \cdot \int_0^{\tau(x)} c(x, t') dt'$$

However, in the DIM method the integration limit can be kept constant. But the illuminating power is arbitrarily varied in terms of space and time.

$$I(x, t) \propto \int_0^t c(x, t') \cdot p(x, t') dt'$$

The DIM method can thus be considered as a further development of the CLEM method, which provides considerable advantages. The functions for illumination described with reference to the patent cited above are step functions, as shown in equation (2), since the illumination is set from a constant to zero when a threshold level is reached. By contrast, $$D(x, t) \propto \int_V \int_0^t p(x, t')^\alpha dt' dV$$

the DIM method of the invention considers arbitrary illumination functions within an exposure time, particularly a fixed exposure time. The special advantage achieved over the CLEM method resides, firstly, in the substantially greater reduction in photobleaching and photodamage due to the dependence of photodamage involving an exponential factor of a that is significantly greater than 1, cf. Hopt A. and Neher E., Biophys., J. 80(4): 2029-2036, Dixit and Cyr, The Plant Journal (2003) 36, 280-290.

For example, halving the laser power reduces photodamage by more than a factor of 5 when the factor $\alpha$ is about 2.5, as determined in a series of experiments for dual photon excitation.

The substantial difference between the method of the invention as presented here and the CLEM technique thus resides in the utilization of this nonlinear dependence of photodamage and photobleaching processes on the beamed intensity with an exponent that is significantly greater than 1, in that maximum use of the pixel dwell time is made and the least possible illuminating power is used.

Furthermore, the reduction of the dynamic range in a shift to the excitation side in dual photon microscopy is considerably larger than in the CLEM method, in which the constant laser power causes the dynamic range of about 5 orders of magnitude to be imaged 1:1 during the exposure time. In the DIM method, the dynamic range is reduced on the excitation side due to nonlinearity problems involving the square root. That is to say, only three orders of magnitude have to be encompassed on the excitation side in order to control six orders of magnitude in the fluorescence signal. In order to resolve fine structures using the CLEM method, the constant laser power used for the entire image must be optimized for the darkest portions, which results in the light portions of the image experiencing extremely short exposure times at a high illumination intensity. However, this results in significantly greater photodamage.

The regulating device can be formed by a real-time computer, for example. This solution permits a high degree of variability. When a particularly rapid regulating process is required, for example when the regulating process is required to be carried out within a pixel dwell time, it may be advantageous if an analog control circuit forms the regulating device. Interim solutions are possible in which part of the regulating process is carried out by the computer and other functions are provided by special analog circuits.

In a further variant, in which the requirements placed on the speed of the regulating process are not so stringent, information concerning the estimated intensity of the light reflected by a point is extracted from a previous measurement, particularly one carried out in the same scan process, of the intensity of the light reflected by an adjacent point.

Even less stringent demands are placed on the speed of the regulating process when the regulating device adjusts the intensity of the excitation light beamed to a specific point on the basis of the intensity of the reflected light determined for this point in a previous image. This is particularly advantageous when time sequences are in any case tracked and accordingly a plurality of images is recorded sequentially. The illumination is in this case regulated accordingly between two exposures times in a time series of images. Information is extracted from previous image recordings, and an illumination profile containing the necessary information concerning the optical properties of the specimen is prepared.

The method of the invention described here can be used to particular advantage in combination with the T-Rex illumination mentioned above. Accordingly, the specimen is, in particular preferably subjected to pulsed illumination with the pulse rate of the excitation light being adjusted to a relaxation time of triplet-states of the dyes with which the specimen has been prepared.

The invention can be used in scanning microscopes, in particular. In order to achieve specific image rates, these microscopes operate with relatively high intensities since only little time is available for each point. Accordingly, the advantages gained by the invention are achieved particularly well in connection with point-scanning microscopes and also with line-scanning microscopes.

The method of the invention can be used equally advantageously when the microscope is a wide field microscope, since it is here again possible to achieve images having a higher dynamic depth while employing lower illuminating power, and thus causing reduced less specimen damage.

The invention can be applied to fluorescence microscopy to particular advantage. Such microscopes are used, in particular, in the field of the biosciences and the problem of photodamaging processes is of particular relevance in this case. In particular, the invention enables higher observation times to be achieved in "live cell imaging", that is, the observation of living cells. This gives rise to completely new research possibilities. In particular, the invention can also be applied to total internal reflection fluorescence microscopy.

Components known per se and intended for the purpose can be used as the intensity modulator. In particular, the intensity modulator can have an AOTF, AOM, a Pockels cell, a Faraday cell and/or a Kerr cell. AOTFs or AOMs are preferably used for applications requiring high speeds.

When using a line scanner, the illumination within the line can be regulated by means of a spatial light modulator. The illumination profile can be readjusted for each line when scanning an entire image.

It is also possible, in principle, for the light source itself to be adjustable in terms of intensity and/or for the light modulator to be an integral part of the light source.

Also, in wide field microscopy, a spatial light modulator can be used for optimization of the illumination on the specimen, which can be effected in the simplest case in the manner of a negative image.

Due to the relatively high light losses in spatial light modulators, those exemplary embodiments are used in which the spatial light modulator is disposed away from a detection beam path.

The method of the invention and the microscope of the invention can be used to particular advantage when the specimen is illuminated by light of substantially one wavelength and the reflected light is detected substantially in one wavelength range, which may be very narrow, if desired. Another large field of application open to the present invention is in the field of multicolor fluorescence microscopy. In this case, the excitation light has several wavelengths for exciting a plurality of different dyes, and the intensity of the light reflected by the specimen is measured in a plurality of spectral ranges. The spectral range can be of a variable widths. Furthermore, the different spectral ranges can be juxtaposed or can overlap or be spaced by a specific range in which no measurements are carried out.

In this type of microscopy, different colors of the fluorescence can be separated in the microscope by means of appropriate optical band pass filters in the emission. This is only readily possible when the emission spectra of the different dyes or fluorophores hardly overlap in the selected wavelength range. In the normal case, the emission spectra of the available dyes are not sufficiently different to make it possible to completely prevent crosstalk by means of filter combinations, without involving an extremely large loss of light. When several colors are used, a method can be applied which is referred to as "spectral unmixing" and which involves an approximate solution of a frequently overdetermined linear equation system in order to assign the photons collected in the channels to the various dyes.

Accordingly, the intensities measured for the different spectral ranges are separated into components pertaining to the respective dyes, and this separation is based on known information concerning the emission spectra of the different dyes and takes into account the position and width of the spectral ranges, and a weighting factor is then determined for each of the different dyes from at least one dye-intensity component pertaining to a spectral range.

This is carried out for each pixel. Thus, for each pixel, a system of equations of the following form is solved: A*x=y, where the matrix A is constructed from the reference spectra of the dyes in the respective wavelength ranges of the detector channels and x describes the unmixed images and y the images in the individual detector channels. It has been proposed to carry out a weighted linear regression in which each channel is weighted for each pixel with the inverse of its noise. Likewise, an error or a signal to noise ratio can then be specified for each unmixed pixel by error propagation, cf. Neher and Neher, Journal of Microscopy, Volume 213, Part 1, January 2004, pp. 46-62.

In fluorescence microscopy involving several colors and spectral detection, the optimum channel position of the detection channels for subsequent spectral unmixing depends not only on the spectra of the fluorophores but also on their concentration distribution or the contribution of the individual fluorophores or dyes to the signal in the different detection channels. This, in turn, is influenced by the beamed excitation intensity of different wavelengths. The prior art constitutes the optimization of excitation and detection for the entire image on the basis of the spectral properties of the dyes. This has been described, for example, in DE 102 22 359 B4. But since the contribution of individual dyes to the brightness in the different channels fluctuates strongly due to the concentration distributions between the individual pixels in many applications, the adjustment of the detection channels is not optimal for most pixels. This results in a larger signal to noise ratio of the individual pixels of the spectrally unmixed images.

The application of the method of the invention to multicolor fluorescence microscopy substantially consists in carrying out a pixel-accurate mixing of the intensities of different excitation wavelengths in order to optimize the contribution of the individual dyes to the detected fluorescence and thus achieve a predetermined signal to noise ratio in the unmixed images. The regulating process is carried out, depending on the system, by rapidly switching the intensities in the different wavelengths. In principle, the intensity modulators described above, such as those of electro-optical or acousto-optical types, particularly Pockels cells or AOMs or AOTFs, or optionally a plurality of spatial light modulators can be used. Readjustment can again be carried out during a pixel dwell time or between two images using a so called "pre-scan", in the manner described above. Readjustment is thus carried out, as in the method described above, but the algorithm for readjustment is more complicated since the intensity regulation of a wavelength does not exclusively influence the contribution of a single dye but possibly the contributions of several dyes to different extents.

When the method of the invention is applied to multicolor fluorescence microscopy, a considerable improvement in the signal to noise ratio and a distinct increase in sensitivity can be achieved. An additional advantage is that the selectivity for the different dyes used can be improved significantly. Here again, the advantages already described, such as an increase in the dynamic depth and reduction of photodamage and bleaching of the dyes are of significance.

Accordingly, the intensity and/or spectral composition of the excitation light beamed to a specific point of the specimen is preferably adjusted automatically by means of the regulating device in response to information previously gained from measured data of the specimen concerning estimated or actual intensities of the light reflected by the point in the different spectral regions such that an integral of the intensities of the light reflected by the point in the different spectral ranges during the pixel dwell time are within value intervals individually specifiable for the different spectral ranges.

Since the weighting factors are variables that are easy to view and manipulate, it is particularly advantageous with respect to evaluation when the value intervals for the different spectral ranges are determined such that the weighting factors for each dye are within a value interval or have a predefined value, which value intervals or values in question for the different dyes are determined individually in each case. The value intervals or values for the weighting factors for the individual dyes should not be mistaken for the value intervals for the intensity integral in the different spectral ranges. But these variables are generally interdependent so that the values for the intensity integral in the individual spectral ranges are basically determined, too, with the determination of the weighting factors, that is to say, the intensity contributions of the individual dyes. These values are accordingly interchangeable with respect to the regulating process.

In terms of equipment, it is advantageous for these applications that the light source emits excitation light of a plurality of wavelengths for exciting a plurality of different dyes. Furthermore, a plurality of detectors is available for multi-color fluorescence microscopy for quantitative and point-specific detection of the light reflected by the specimen in a plurality of spectral ranges.

BRIEF DESCRIPTION OF THE DRAWINGS

Additional advantages and features of the present invention are explained below with reference to the accompanying diagrammatic figures.

DETAILED DESCRIPTION

The structure of a microscope of the invention and the elementary sequences of the method of the invention are explained below with reference to FIGS. 1 and 7. Additional exemplary embodiments are then explained with reference to FIGS. 2 to 6 and 8. Equivalent components in the figures are provided with the same reference signs.

Figure 1:
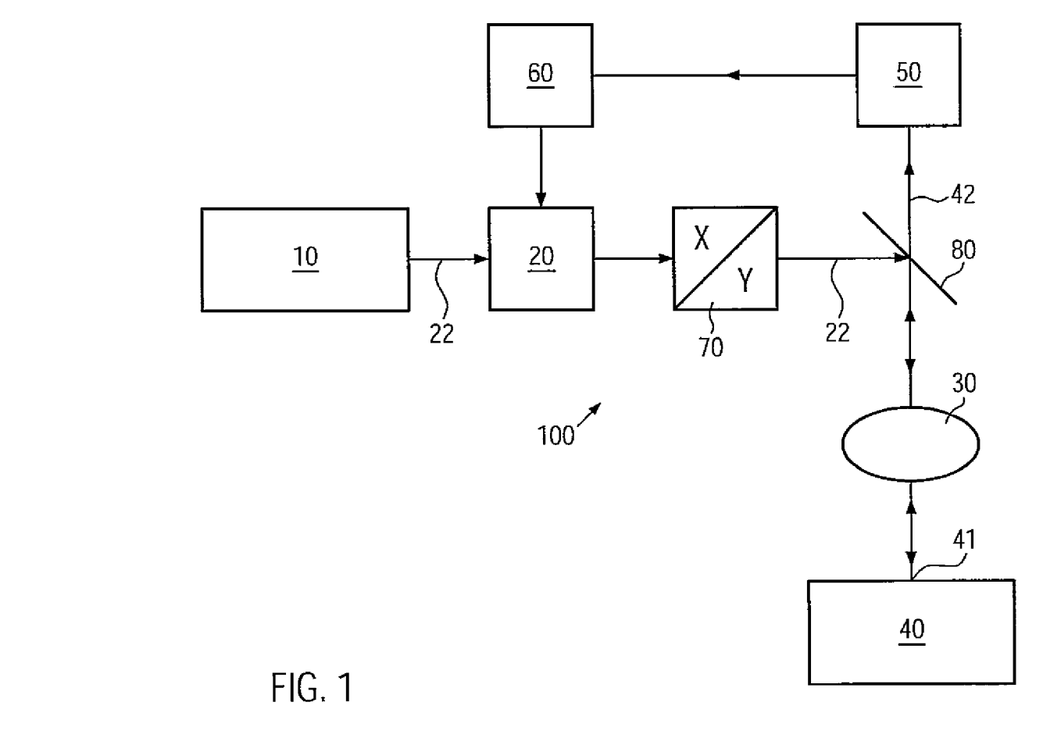
FIG. 1 is a diagrammatic representation of a microscope of the invention.

The microscope 100 of the invention shown diagrammatically in FIG. 1 is a point-scanning microscope. The microscope 100 includes a light source 10 such as a laser, an intensity modulator 20, a scanning device 70, a microscope optics 30, a detector 50 and a regulating device 60. The light source 10 emits excitation light 22 for the microscopic examination of a specimen 40. An intensity of the excitation light 22 is selectively adjusted, according to the invention, with the aid of the intensity modulator 20. The excitation light 22 reaches a point 41 of the specimen by way of the scanning device 70, a main beam splitter 80 and the diagrammatically illustrated microscope optics 30. The excitation beam of the excitation light 22 can be rastered or scanned with the aid of the scanning device 70, the intensity being adjusted in each case point-specifically, according to the invention, as described below in more detail.

A focal volume surrounding the point 41 is excited by the excitation light 22. For example, dye molecules present in such surroundings can be raised to an electronically excited state. Consequently, the focal volume radiates electromagnetic radiation 42 such as fluorescent light.

This light 42 radiated from point 41 in turn passes through the microscope optics 30, the main beam splitter 80 and other optical components not shown in detail to reach a detector 50 in which the intensity of the reflected light 42 is measured quantitatively. The measured data provided by the detector 50 are fed to the regulating device 60. On the basis of the measured data of the specimen 40, the regulating device 60 adjusts the intensity of the excitation light 22, according to the invention, with the aid of the intensity modulator 20 in such a way that the intensity integral of the reflected light is constant during a pixel dwell time.

A point scanner, as such, offers the possibility of providing pointwise illumination. In order to achieve short switching times of the intensity modulator 20, which is typically an AOTF, the diameter of the beam can, while passing through the intensity modulator 20, be reduced using techniques known per se.

For the regulating process, the logic unit that controls the detector and can be an FPGA, for example, evaluates the counting rate and determines whether the light intensity reaching the specimen is too high or too low. Limiting values can be defined for this purpose. Thereupon, the logic unit can generate a real-time transmission to an appropriate logic unit regulating the illumination, for example, a control unit of an AOTF. The process of controlling the illumination appropriately adjusts the intensity of illumination with the least possible delay. At the same time, a higher-level system is informed of the manipulation of the illumination so that the detector values recorded thereinafter can be recalculated. This is described below with reference to FIG. 7.

In general, the sequences S10, S20 and S30 are processed one after the other. Step S10 involves a "system set-up", wherein, when observed as modules, the behavior of the specimen in relation to optical excitation with a laser is detected and evaluated in Step 11. In Step 12, a working range is then located and described in detail. Steps S20 to S25 contain details of the regulating process. Following the start of the process for a pixel in S20, an online examination of the excitation takes place in Step S21. Step 22 then involves a query as to whether a counting rate can be measured. If so, the photons entering the detector are counted in Step 23. If no photons can be detected, the regulating device changes the settings of the intensity modulator 20 in Step S24. After saving the settings of the intensity modulator 20 in Step S25, the process is repeated beginning with Step S21. The procedure for a pixel is finalized in Steps S30 and S31, a photon-counting rate being computed in S31 on the basis of the settings of the intensity modulator 20.

As a result of the modulated illumination, the specimen is subjected to point-specific non-linear bleaching effects. In principle, the latter can be computed point-specifically since the type of influence is known.

Figure 2:
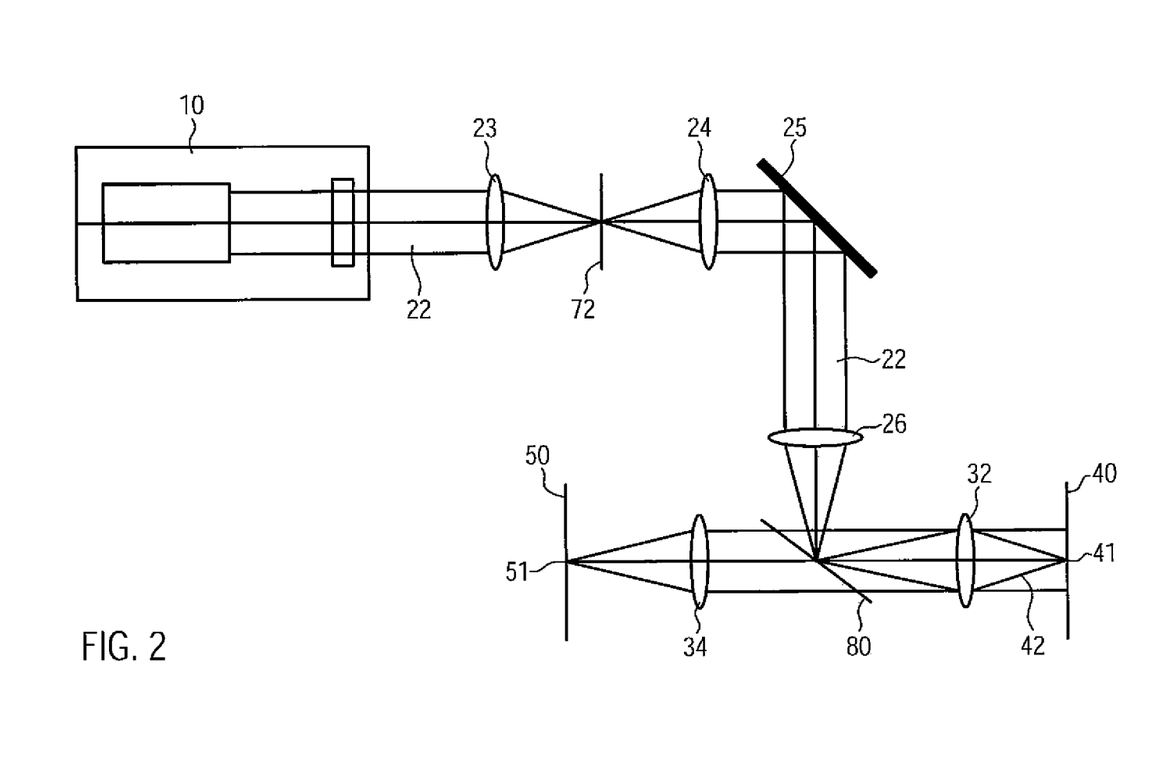
FIG. 2 is a diagrammatic representation of a line scanner.

FIG. 2 diagrammatically shows a line scanner. Here, excitation light 22 from a light source 10 is focused via a slit diaphragm (not illustrated) and a lens 23 to form a line on the scanner 72. With the aid of the lens 24, which is also referred to as a scanning objective, the excitation light 22 is scanned via a spatial light modulator 25. A tube lens 26 then focuses the beam onto the main beam splitter 80 which is a dichroitic beam splitter. This reflects the excitation light, which is imaged through the objective 32 as a line on the specimen 40. Fluorescent light 42 emitted from a point 41 of the specimen 40 is in turn imaged by the objective 32 and then with the aid of a tube lens 34 onto a point 51 of a spatially resolving detector 50. Due to a wavelength shift of the fluorescent light, the latter can pass through the main beam splitter 80. The spatially resolving detector 50 is read out through a virtual aperture. Thus, for example, only one detector element in the region of point 51 is read out in order to provide confocality.

The specimen is positioned in the right-side focal plane of the objective 32 and a center of the main beam splitter 80 is positioned in a left-side focal plane of the objective 32.

In the exemplary embodiment shown in FIG. 2, the paths of the excitation beam and detection beam are separate. The detrimental optical properties such as high light losses in the spatial light modulator therefore do not have any adverse effect on the detection side. Scanning of the two-dimensional spatial light modulator allows for only relatively low switching speeds so that readjustments can be carried out in general only from image to image, but not within a line in most cases. The least possible number of optical components in the detection beam path provides maximum sensitivity and thus leads to reduced photodamage in the specimen. Line scanners are advantageous, for a given frame rate, over point scanners since the pixel dwell time is longer and the intensity of the excitation radiation can thus be lower. As a result, photodamaging processes are diminished. The use of the spatial light modulator additionally allows for a combination of this method with other techniques for structured illumination, for example, for resolution enhancement. The spatial light modulator 25 is readjusted for each image in a feedback loop comprising a camera, for example, and using a real-time computer.

Figure 3:
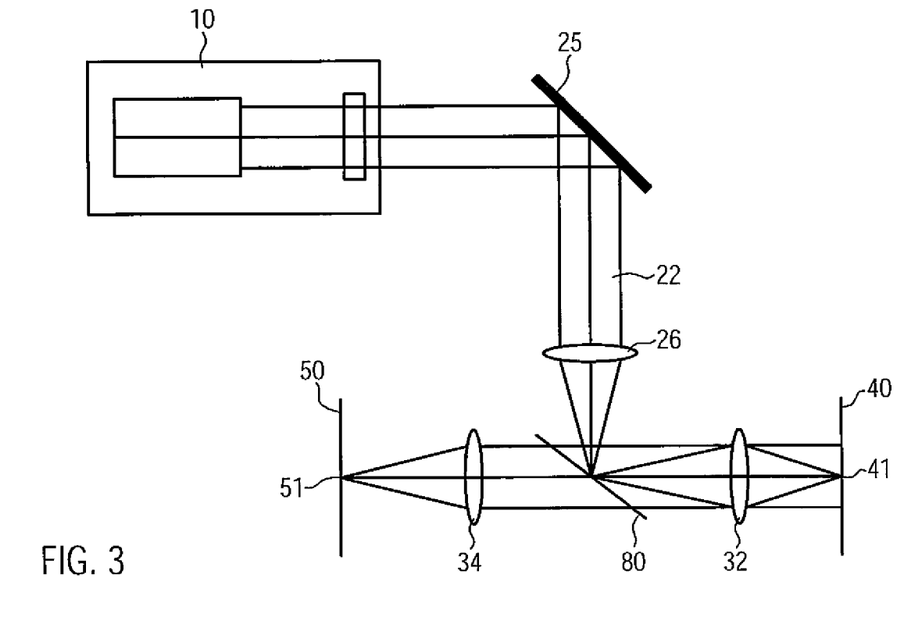
FIG. 3 is a diagrammatic representation of a wide field microscope.

In the wide field arrangement shown in FIG. 3, a detector 50 with two-dimensional spatial resolution is used. In other respects, the conditions in the detection beam path largely correspond to the line scanner described with reference to FIG. 2. The arrangement in the excitation beam path in which a spatial light modulator 25 is likewise used, is considerably simpler, since the entire specimen area is illuminated. For a given frame rate, the wide field arrangement allows for minimum excitation intensity per pixel, since the exposure time can be appropriately longer in this case. As in the exemplary embodiment shown in FIG. 2, the spatial light modulator in FIG. 3 is again not situated in the detection beam path so that the properties of the spatial light modulator that are detrimental in this respect become irrelevant. The use of the spatial light modulator in a wide field allows for readjustment between the images and for a combination of this method with other methods for structured illumination in order to carry out high-resolution microscopy with dynamic imaging.

Figure 4:
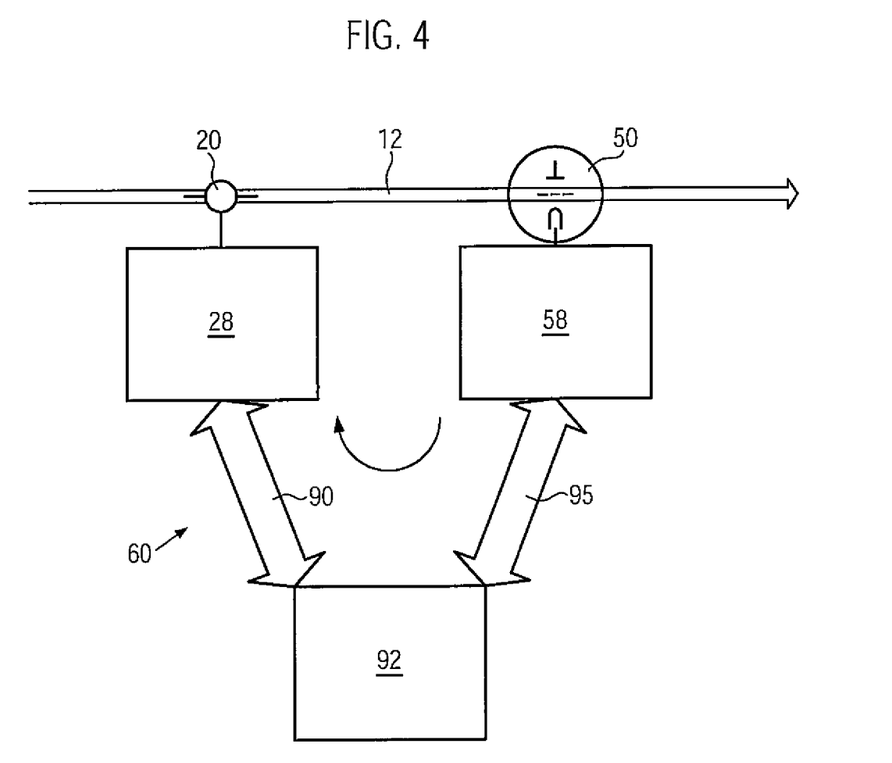
FIG. 4 is a diagrammatic representation of a control circuit comprising a real-time computer.
Figure 5:
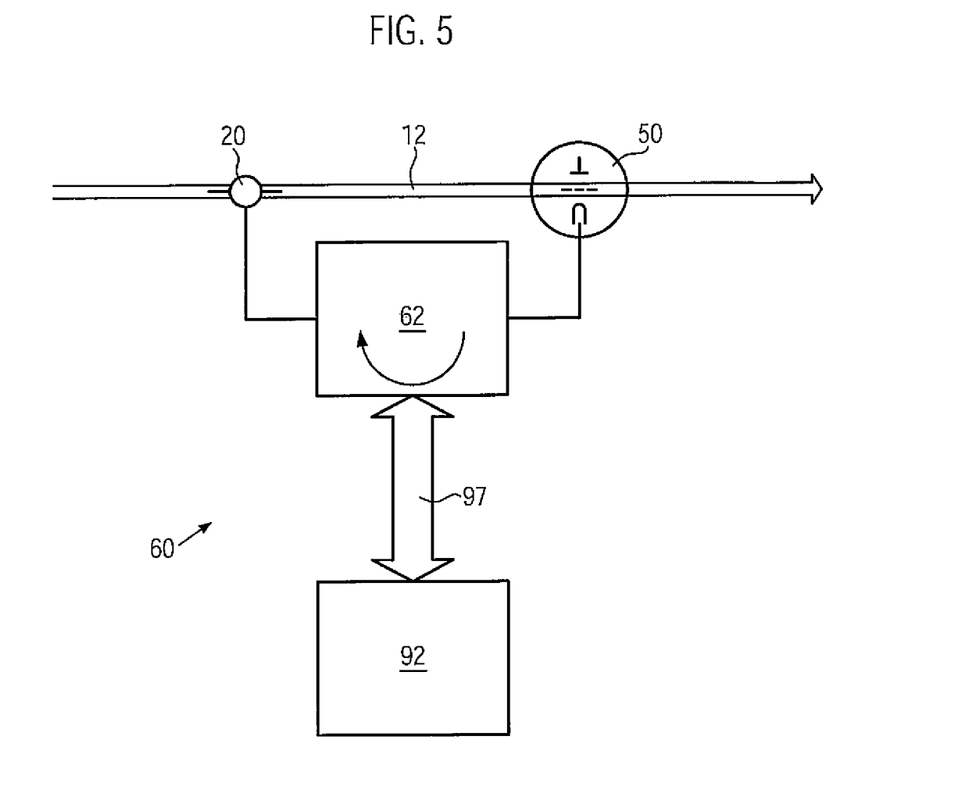
FIG. 5 is a diagrammatic representation showing a combined electronic modulator and detector circuit.

Different variants of regulating devices are now explained with reference to FIGS. 4 to 6. A point-scanning system offers several ways of producing an advantageous control circuit. For example, FIG. 4 shows an arrangement based on an existing modular laser-scanning microscope in which an existing data-processing path is used in order to acquire the necessary control parameters and to transfer the same to the final controlling element. Significant components of the regulating system shown in FIG. 4 include an intensity modulator 20 disposed in the beam path 12 and comprising an electronic modulator circuit 28 and a detector 50 having an electronic detector circuit 58. As indicated by double arrows 90, 95, these components operatively interact with a controller 92 that can, in particular, be a real-time computer. The electronic modulator circuit 28 is controlled on the basis of the data acquired in the detector 50 and transferred through the data-processing path 95 to the controller 92.

Furthermore, an existing non-modular laser-scanning microscope can be adapted accordingly. In such a case, the control parameters need not be transmitted through a data transfer path, as a result of which shorter reaction times are possible. Such an arrangement is shown in FIG. 5. The figure shows a combined electronic modulator and detector circuit 62, indicated by a double arrow 97, that operatively interacts with the controller 92.

Figure 6:
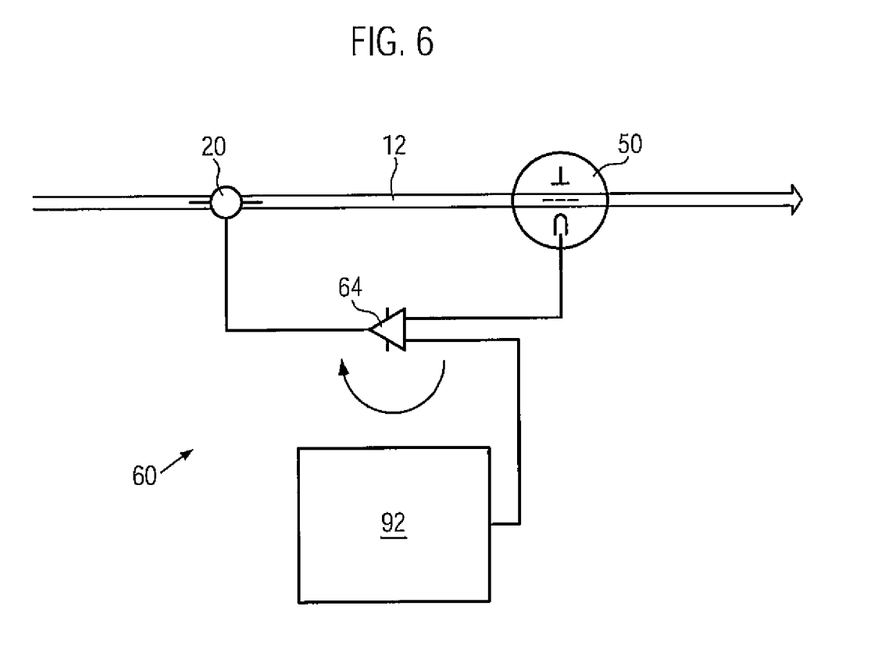
FIG. 6 is a diagrammatic representation of a regulating device consisting of an analog switching circuit.
Figure 7:
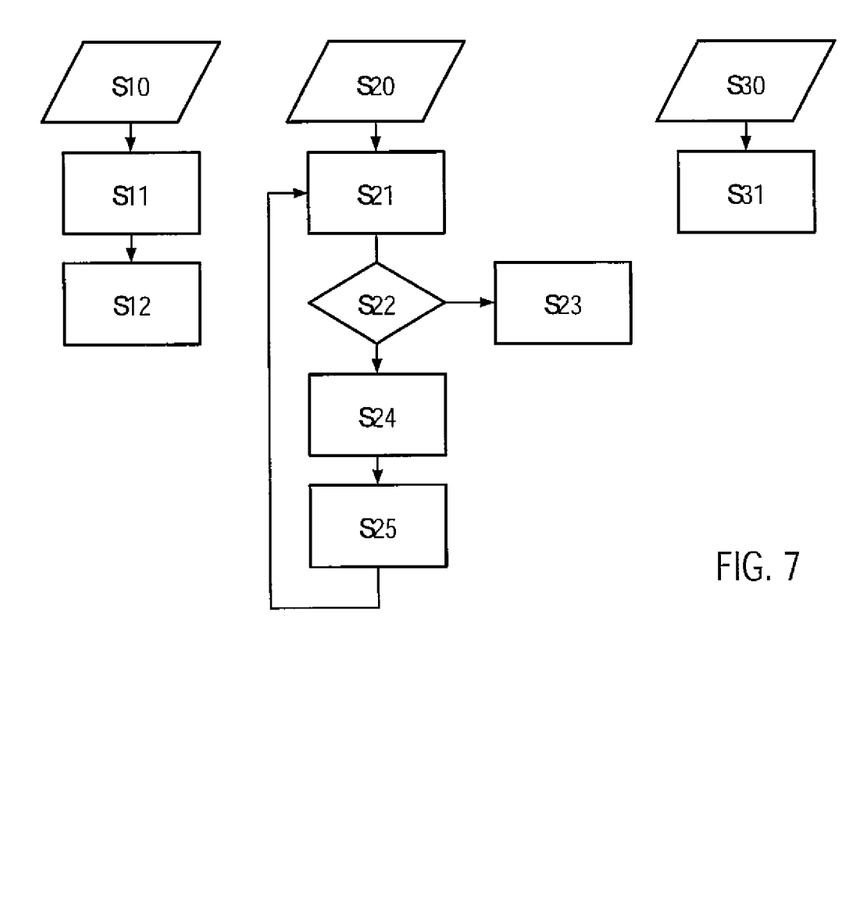
FIG. 7 is a flowchart comprising parts of the sequences of the method of the invention.

Finally, a special analog electronic system 64 that performs the regulating process can be developed as shown diagrammatically in FIG. 6. The regulating parameters are then adjusted externally, for example, by the controller 92. The reaction time of the regulating process then depends only on the final controlling elements and detectors used.

Figure 8:
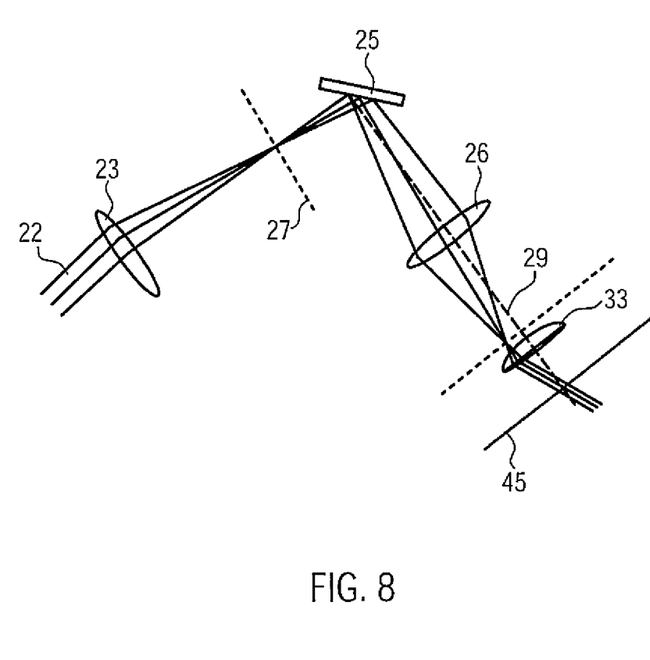
FIG. 8 is a diagrammatic representation of the beam path in a TIR microscope.

The beam path in a total internal reflection microscope is shown diagrammatically in FIG. 8. The method of the invention described herein can likewise be applied, to advantage, to this type of microscopy, for example, in order to provide longer observation times for the examination of living cells. FIG. 8 shows the main components of the excitation beam path in such a microscope in which the intensity of the excitation light is modulated spatially, according to the invention.

The excitation light 22 is focused, as a laser beam that has been expanded in a manner known per se or a beam of another light source, onto the conjugate, image-side focal plane 27 by way of a lens 23 that, like the beam of excitation light 22, is slightly offset perpendicularly to an optical axis 29 of an objective 33 so that, following reflection by a spatial light modulator 25 and imaging through a lens 26, the excitation light 22 is focused onto a point in the focal plane 31 that is situated at a maximum distance from the optical axis 29. This enables the excitation light 22 to leave the objective 33 at a small angle of emergence, thus causing a small penetration depth of the evanescent waves across the total reflection. A specimen is then positioned in the region of the object-side focal plane 45 of the objective 33. The spatial light modulator 25 is formed in the intermediate image formed by the objective 33 and the lens 26 so that the inventive spatial modulation of the excitation light 22 with the aid of the spatial light modulator 25 is imaged in or on the specimen 40. In principle, the same advantages can be achieved with this arrangement as are obtained with the wide field arrangement described with reference to FIG. 3.

The present invention relates to a novel microscope and a novel method in which the intensity of illumination is specifically adjusted in a spatially differentiated manner to suit specifically the optical properties of the object or the specimen for the purpose of imaging an object. In microscopy, in particular, this results in advantages with regard to the extension of the dynamic range and the reduction of photodamage in the cells being examined and additionally to reduction of bleaching of the dyes used. The arrangement proposed by the invention requires at least one light source, an intensity modulator, which can be an amplitude modulator and/or a polarization modulator, a detector and feedback regulation from the detector to the intensity modulator. A guide value such as an upper barrier must then be established with regard to the intensity to be achieved. It is furthermore recommended to establish a background criterion so that the regulating process of the invention is effective only on the radiation actually coming from the specimen to be examined. This is another way in which it differs from the CLEM method described at the outset that expressly implements two threshold levels. In the method of the invention, the intensity to be achieved is an upper barrier that the illumination regulating process attempts to reach but need not exceed. In addition, the background criterion, that is to say, the decision as to whether a pixel pertains to the background or is a signal, can be established by external means and need not be determined from measured light ensuing, for example, from previously measured data.

The invention claimed is:
1. A method for operating a microscope, comprising:
beaming excitation light to different points of a specimen, point-specifically varying an intensity of the excitation light and measuring point-specifically and quantitatively an intensity of the light reflected by the specimen in at least one spectral range, and automatically adjusting, by a regulating device, at least one of the intensity or a spectral composition of the excitation light beamed to a specific point of the specimen on the basis of information previously gained from measured data of the specimen concerning at least one of an estimated intensity or an actual intensity of the light reflected in the spectral range by the specific point, such that an integral of the intensity of the light reflected in the spectral range by the specific point during a pixel dwell time is within a predefined value interval, wherein the information concerning the estimated intensity of the light reflected by the point is provided by an initial measurement of the intensity of the light reflected by the point at the start of a pixel exposure time and an adjustment, by the regulation device, to the correct intensity within the pixel exposure time.

2. The method as defined in claim 1, further comprising: adjusting, by the regulating device, the intensity of the excitation light for the specific point such that the integral of the intensity of the light reflected by the specific point during a pixel dwell time is within a predefined value interval only when a signal criterion for the specific point is satisfied.

3. The method as defined in claim 1, wherein the excitation light includes a plurality of wavelengths for exciting a plurality of different dyes and wherein the intensity of the light reflected by the specimen is measured in a plurality of different spectral regions.

4. The method as defined in claim 1, further comprising: adjusting, by the regulating device, the intensity of the excitation light beamed to the specific point on the basis of an intensity of the reflected light detected for the specific point in a previous image.

5. The method as defined in claim 1, further comprising: setting the value interval for the integral of the intensity of the light reflected by the specific point during the pixel dwell time such that a detector is able to operate with maximum sensitivity and with a maximum signal to noise ratio.

6. The method as defined in claim 1, wherein regulation is effected such that the intensity of the excitation light for the specific point during a pixel dwell time is constant to a maximum extent following a stabilization phase of the regulating process.

7. The method as defined in claim 1, wherein the regulating device adjusts the intensity of the excitation light for the specific point such that the integral of the intensity of the light reflected by the specific point during a pixel dwell time is within a predefined value interval only when a signal criterion for the specific point is satisfied.

8. The method as defined in claim 1, wherein regulation is effected such that the integral of the intensity of the light reflected during a pixel dwell time by at least one point satisfying a signal criterion, is constant.

9. The method as defined in claim 1, wherein the same pixel dwell time is used for all points.

10. The method as defined in claim 1, wherein the same pixel dwell time is used for all points for which a signal criterion is satisfied.

11. The method as defined in claim 1, wherein a signal criterion for the specific point is satisfied if at least one of the estimated intensity and the actual intensity of the light reflected by the specific point is above a specifiable background threshold.

12. The method as defined in claim 1, wherein a signal criterion for the specific point is satisfied when an externally supplied point-specific signal has a predefined value.

13. The method as defined in claim 1, wherein the regulating device adjusts the intensity of the excitation light beamed to the specific point on the basis of an intensity of the reflected light measured for the specific point in a previous image.

14. The method as defined in claim 1, wherein the information concerning the estimated intensity of the light reflected by the specific point is provided by a previous measurement of the intensity of the light reflected by an adjacent point.

15. The method as defined in claim 1, further comprising: recording a test pattern or test scan for roughly ascertaining the intensity of the light reflected by individual points.

16. The method as defined in claim 1, further comprising: pulse-illuminating the specimen wherein a pulse rate of the excitation light is adapted to a triplet relaxation time of dyes with which the specimen has been prepared.

17. The method as defined in claim 1, wherein the excitation light includes a plurality of wavelengths for exciting a plurality of different dyes and the intensity of the light reflected by the specimen is measured in a plurality of different spectral ranges.

18. The method as defined in claim 17, wherein at least one of the intensity or the spectral composition of the excitation light beamed to the specific point of the specimen is automatically adjusted by the regulating device on the basis of information concerning estimated intensities or actual intensities of the light reflected by the specific point in the different spectral ranges, as previously gained from measured data of the specimen, such that integrals of the intensity of the light reflected by the specific point in the different spectral ranges during the pixel dwell time are within value intervals in each case individually specifiable for the different spectral ranges.

19. The method as defined in claim 17, further comprising: separating the intensities measured for the different spectral regions into portions pertaining to the respective dyes, wherein the separation is carried out on the basis of known information concerning emission spectra of the different dyes while taking into consideration a position and width of the spectral ranges; and determining for each of the different dyes a weighting factor from in each case at least one intensity portion of the respective dye pertaining to a spectral range.

20. The method as defined in claim 18, wherein the value intervals for the different spectral ranges are fixed such that the weighting factors for each dye lie in a value interval or have a predefined value, which value interval or value is individually specifiable for each of the different dyes.

21. A microscope, comprising:
a light source for emission of excitation light for microscopic investigation of a specimen,
an intensity modulator for varying an intensity of the excitation light,
microscope optics for guiding the excitation light to different points of the specimen and for guiding the light reflected by the different points of the specimen to a detector for point-specific and quantitative detection of the intensity of the light reflected by the specimen in at least one spectral range, and
a regulating device, which cooperates with the intensity modulator and the detector, for automatically adjusting at least one of the intensity or a spectral composition of the excitation light beamed to a specific point of the specimen on the basis of information, previously gained from measured data of the specimen, concerning an estimated intensity or actual intensity of the light reflected in the spectral range by the specific point, such that an integral of the intensity of the light reflected in the spectral range, as detected by the detector for the specific point, during a pixel dwell time is within a predefined value interval, wherein the information concerning the estimated intensity of the light reflected by the point is provided by an initial measurement of the intensity of the light reflected by the point at the start of a pixel exposure time and an adjustment, by the regulation device, to the correct intensity within the pixel exposure time.

22. The microscope as defined in claim 21, wherein the regulating device adjusts the intensity of the excitation light for the specific point such that the integral of the intensity of the light reflected by the specific point during a pixel dwell time is within a predefined value interval only when a signal criterion for the specific point is satisfied.

23. The microscope as defined in claim 21, wherein the light source emits excitation light having a plurality of wavelengths for excitation of a plurality of different dyes and wherein a plurality of detectors is present for quantitative and point-specific determination of the light reflected by the specimen in a plurality of spectral ranges.

24. The microscope as defined in claim 21, wherein the regulating device adjusts the intensity of the excitation light beamed to the specific point on the basis of an intensity of the reflected light as determined for the specific point in a previous image.

25. The microscope as defined in claim 21, wherein the microscope is selected from the group consisting of a scanning microscope, a line-scanning microscope, a wide field microscope, a fluorescence microscope, and a total internal reflection fluorescence microscope.

26. The microscope as defined in claim 21, wherein the intensity modulator includes at least one of an AOTF, an AOM, a Pockels cell, a Faraday cell, and a Kerr cell.

27. The microscope as defined in claim 21, wherein the intensity modulator includes a spatial light modulator.

28. The microscope as defined in claim 27, wherein the spatial light modulator is disposed away from a detection beam path.

29. The microscope as defined in claim 21, wherein the regulating device is selected from the group consisting of a real time computer and an analog control circuit.

30. The microscope as defined in claim 21, wherein the light source emits excitation light having a plurality of wavelengths for exciting a plurality of different dyes.

31. The microscope as defined in claim 21, wherein a plurality of detectors is present for quantitative and point-specific determination of the light reflected by the specimen in a plurality of spectral ranges.

32. The method as defined in claim 1, wherein the microscope comprises:

a light source for emission of the excitation light, an intensity modulator for varying the intensity of the excitation light, microscope optics for guiding the excitation light to different points of the specimen and for guiding the light reflected by the different points of the specimen to a detector for point-specific and quantitative detection of the intensity of the light reflected by the specimen in at least one spectral range, and the regulating device.

33. The method as defined in claim 1, wherein the excitation light is focused on different points of a specimen.

34. The method as defined in claim 14, wherein the previous measurement is carried out in the same scan process.

* * * * *